US012673893B2

(12) United States Patent
Liu et al.

(10) Patent No.:  US 12,673,893 B2
(45) Date of Patent:      Jul. 7, 2026

(54) COLOR CHANGING WALL COMPOUNDS AND METHODS OF USE

(71) Applicant: 3M INNOVATIVE PROPERTIES COMPANY, St. Paul, MN (US)

(72) Inventors: Lan H. Liu, Rosemount, MN (US); Richard J. Pokorny, Maplewood, MN (US); Thomas P. Klun, Lakeland, MN (US); Yong K. Wu, Woodbury, MN (US); Bathsheba E. F. Chong Conklin, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 281 days.

(21) Appl. No.: 18/559,528

(22) PCT Filed: May 12, 2022

(86) PCT No.: PCT/IB2022/054431
§ 371 (c)(1),
(2) Date: Nov. 7, 2023

(87) PCT Pub. No.: WO2022/238955
PCT Pub. Date: Nov. 17, 2022

(65) Prior Publication Data
US 2024/0228376 A1    Jul. 11, 2024

Related U.S. Application Data

(60) Provisional application No. 63/310,165, filed on Feb. 15, 2022, provisional application No. 63/189,432, filed on May 17, 2021, provisional application No. 63/188,602, filed on May 14, 2021.

(51) Int. Cl.
| | |
|---|---|
| *C04B 14/42* | (2006.01) |
| *C04B 14/28* | (2006.01) |
| *C04B 26/06* | (2006.01) |
| *C04B 103/00* | (2006.01) |
| *C04B 111/00* | (2006.01) |

(52) U.S. Cl.
CPC .............. *C04B 14/42* (2013.01); *C04B 14/28* (2013.01); *C04B 26/06* (2013.01); *C04B 2103/0011* (2013.01); *C04B 2103/0094* (2013.01); *C04B 2111/00672* (2013.01)

(58) Field of Classification Search
CPC ......... C04B 14/42; C04B 14/28; C04B 26/06; C04B 2103/0011; C04B 2103/0094; C04B 2111/00672; C04B 2111/72; C04B 40/0096; C04B 14/44; C04B 22/062; C04B 2103/54; C04B 14/24; C04B 16/08; C04B 22/064; C04B 22/124; C04B 24/383; C09D 5/34
See application file for complete search history.

(56) References Cited

U.S. PATENT DOCUMENTS

| | | | |
|---|---|---|---|
| 2,913,311 A | 11/1959 | Senn et al. | |
| 3,032,396 A | 5/1962 | Kennedy et al. | |
| 3,365,315 A | 1/1968 | Beck et al. | |
| 3,709,706 A | 1/1973 | Sowman | |
| 4,166,147 A | 8/1979 | Lange et al. | |
| 4,391,646 A | 7/1983 | Howell | |
| 6,531,528 B1 * | 3/2003 | Kurp ................... | C04B 40/0096 |
| | | | 524/323 |
| 8,507,587 B2 | 8/2013 | Gozum et al. | |
| 8,507,857 B2 | 8/2013 | Itou et al. | |
| 8,772,389 B1 | 7/2014 | Brandon et al. | |
| 8,877,840 B2 | 11/2014 | Gozum et al. | |
| 9,828,782 B2 | 11/2017 | Wang et al. | |
| 10,273,185 B2 | 4/2019 | Gozum et al. | |
| 11,065,354 B2 | 7/2021 | Hajime et al. | |
| 2005/0143505 A1 | 6/2005 | Rosekelly et al. | |
| 2006/0236470 A1 * | 10/2006 | Sabnis ..................... | A61Q 1/06 |
| | | | 8/405 |
| 2007/0100035 A1 | 5/2007 | Rosekelly et al. | |
| 2014/0088533 A1 * | 3/2014 | Joseph .................... | A61F 13/42 |
| | | | 524/158 |
| 2014/0261091 A1 * | 9/2014 | Brennan ................. | C04B 28/14 |
| | | | 106/775 |
| 2020/0156999 A1 * | 5/2020 | Donovan .............. | B05D 3/007 |
| 2020/0290927 A1 * | 9/2020 | Wang ....................... | C08K 7/18 |
| 2022/0127488 A1 * | 4/2022 | Knight ............... | H01M 50/126 |

FOREIGN PATENT DOCUMENTS

| | | | | |
|---|---|---|---|---|
| EP | 0549145 | 6/1993 | | |
| EP | 2452987 B1 | 7/2020 | | |
| JP | S5358534 A | 5/1978 | | |
| WO | WO-0066508 A2 * | 11/2000 | ............. | C04B 26/06 |
| WO | WO-0244254 A1 * | 6/2002 | ............. | C08K 5/41 |
| WO | 2020102619 A2 | 5/2020 | | |

OTHER PUBLICATIONS

US 6,027,799 A, 02/2000, Castle (withdrawn)
Extended European Search Report for European Patent Application No. 2 280 6956.3, mailed on Jan. 26, 2025, 9 pages.
Cornwell, "Thymoltetrachlorophthalein and Some of its Derivatives", Journal of the American Chemical Society, 1927, vol. 49, No. 3, pp. 826-830.
International Search Report for PCT International Application No. PCT/IB2022/054431, mailed on Jun. 29, 2022, 4 pages.
Molchanov, Corrosion of silicate glasses by alkaline solutions Communication 3. Inhibitors of the alkaline corrosion of glasses, Jul. 1958, vol. 7, No. 7, pp. 783-789.
Sabnis, "Developments in the chemistry and applications of phthalein dyes. Part 1: Industrial applications", Coloration Technology, 2018, vol. 134, pp. 187-205.
Sabnis, "A facile synthesis of phthalein indicator dyes" Tetrahedron Letters, Nov. 2009, vol. 50, No. 46, pp. 6261-6263.

* cited by examiner

*Primary Examiner* — Pamela H Weiss
(74) *Attorney, Agent, or Firm* — Ann K. Gallagher

(57) ABSTRACT

A wall compound for use in all applications and particularly well-suited indicating dryness with a durable, visible change in color.

19 Claims, No Drawings

COLOR CHANGING WALL COMPOUNDS AND METHODS OF USE

TECHNICAL FIELD

The present disclosure relates generally to materials such as paste or putties, which are used to join adjacent wall panels and repair blemishes or defects in wall surfaces.

BACKGROUND

In the construction of buildings and residential remodeling, one of the most common elements is gypsum wallboard, often known as drywall, used in the construction of walls and/or ceilings. Walls made from gypsum wallboard are traditionally constructed by affixing panels to wood studs or metal framing. Two side-by-side panels disposed in the same plane will form a joint seam between them on vertical walls and horizontal ceilings. The joints between adjacent wallboard panels are filled using a composition commonly called joint compound to conceal the joints and create the appearance of a monolithic surface. The side edges of the drywall panels can be tapered, allowing the joint compound to be applied to the seam, between adjoining panels, in such a way that a monolithic surface is created when finished.

When cavities, recesses, holes, etc., are present (due to imperfections or damage) in exterior or interior surfaces such as walls and ceilings, it is common to use a wall repair compound, and in particular a spackling compound, to fill such cavities. Conventional spackling compounds often include one or more inorganic fillers, one or more polymeric resin binders, and various thickeners and other additives. Lightweight spackling compounds have been developed that often contain, among other inorganic fillers, relatively low density fillers such as glass bubbles, hollow silica, or expanded perlite. After the spackling compound is applied to a wall, the water evaporates over time resulting in the formation of a dried, hardened material that can be sanded, painted, etc. While spackling compounds and joint compounds do many of the same things and are both smeared onto walls to hide flaws, spackling compounds are generally lighter, dry more quickly, sand more easily, and are more expensive than joint compounds. For simplicity, the term "wall compound" as used throughout the present disclosure is inclusive of spackling compounds and joint compounds.

As the sufficient hardening of both joint and spackling compounds is commonly desired or even necessary for subsequent work operations (sanding, taping, painting, application of additional compound layers, etc.), wall compounds have been formulated with visual indicators that demonstrably change color once the compound has dried. Kurp (U.S. Pat. No. 6,531,528) provides an aqueous, alkaline repair composition comprising resin binder, pigment, and pH color change indicator. The pH color change indicator possesses color when maintained at an alkaline pH and loses color upon drying of the repair composition. Kurp particularly exemplifies compositions that are colored red to pink and turn white upon drying, while also suggesting use of blue to white pH color change indicators. The loss of color or a white appearance post drying is of particular importance for wall compounds, as this renders the resulting surface much easier to paint over and obscure the seam or repaired surface.

SUMMARY

The inventors of the present disclosure recognized that dryness indication of wall compounds could be significantly improved by use of thymolphthalein-based color indicator compounds in combination with synthetic filler. The color blue is already positively associated with wall-focused tasks (see e.g., ScotchBlue™ painter's tape) and promotes serenity. Glass bubbles and other synthetic fillers are particularly useful in formulating wall compounds, given their ability to provide sufficient strength and ease of application while reducing the wall compound's tendency to sag, shrink, or crack once applied. Such fillers tend to corrode or degrade, however, in the type of alkaline environment needed for dramatic color change upon drying, especially changes from blue to white. Corrosion of glass bubbles in particular leads to the formation of sodium borate (Borax), which reduces alkalinity and tends to react with thymolphthalein-based pH indicators to fade the color over time. Unless used soon after formulation, typical wall compounds containing both glass bubbles and thymolphthalein-based color indicators fail to appreciably change color upon drying, as they either remain blue on the wall or fade to white on the shelf. Such relatively rapid change is untenable for typical DIY consumers or retailers, who may retain product on shelf for years at a time.

Surprisingly, the present inventors discovered that select packages of cellulosic thickeners and ion inhibitors can be combined with synthetic fillers in an acrylic resin to provide a wall compound meeting or exceeding the performance requirements expected and desired of color changing wall compounds. The present disclosure accordingly provides wall compounds that have reduced to rapid dry times while still possessing desirable attributes of easy application, workable open time, and resistance to sagging. The wall compounds further provide low to no shrinkage and low to no cracking upon drying.

Wall compounds of the present disclosure can also be suitable for filling and repairing relatively large holes or cavities (e.g., major dimension of at least 2 inches), cracks or other imperfections in a surface (such as, for example, a gypsum wallboard surface), as well as virtually any other, smaller wall surface imperfections. Wall compounds of the present disclosure are aqueous and generally include a latex resin, a thickener package, synthetic inorganic filler material, a pH indicator, and an inhibitor.

Further embodiments provide a method for affixing and holding two panels together at a joint seam. In other embodiments, the wall compound is provided as part of a kit. In some embodiments, the kit includes a tool.

DETAILED DESCRIPTION

Various embodiments and implementations will be described in detail. These embodiments should not be construed as limiting the scope of the present disclosure in any manner, and changes and modifications may be made without departing from the spirit and scope of the inventions. For example, many of the embodiments, implementations, and examples are discussed with specific reference to wall repair, but these should not be construed to limit the application scope to this one exemplary implementation. Further, only some end uses have been discussed herein, but end uses not specifically described herein are included within the scope of the present disclosure. As such, the scope of the present disclosure should be determined by the claims.

Wall compounds of the present disclosure are aqueous and generally include a latex resin, filler, a pH color change indicator, and an inhibitor. Wall compounds may further include a thickener package. The filler may include at least one of a synthetic inorganic filler and a natural inorganic filler. Other optional ingredients may be included in various other embodiments. In some embodiments, the thickener in combination with the inhibitor and pH indicator produces a wall compound that is shelf stable and produces an observable color change on drying. The pH of the above formula is preferably 11-14 to promote enhanced stability of indicator color during the storage and application.

Resin

The wall compounds of the present disclosure comprise at least one latex resin or resin binder, such as a polymeric resin binder conventionally viewed as being useful with wall compounds. Such binders are often supplied as an aqueous latex emulsion (for example, comprising between 15-60 percent solids of polymeric resin binder, in water). Exemplary polymeric resins potentially suitable for binders of the present disclosure include, for example, the well-known vinyl acrylic polymers and copolymers, acrylic polymers and copolymers, polyvinyl acetate polymers and copolymers, ethylene vinyl acetate polymers and copolymers, styrene-butadiene polymers and copolymers, polyacrylamide polymers and copolymers, natural rubber latex, natural and synthetic starch, casein, and the like. Such binders can be used alone or in combination with one another. In some embodiments, the resin or resin binder is 100% acrylate. In some embodiments, the resin or resin binder portion of the wall compound includes at least one latex resin and at least one non-latex resin. In some embodiments, the latex and non-latex resin form a uniform blend.

The resin binder latex used, in presently preferred implementations, has substantially no $NH_3$ or ammonium salts contained in the latex, so as to maintain the color stability of the compound prior to drying. Stabilization with ammonia can lead to instability of the formulations, particularly those made with glass bubbles. Further, the resin binder latex is preferably provided in a milky or otherwise white color prior to inclusion in a wall compound formulation.

In some embodiments, the latex resin is an acrylic latex emulsion binder. These can contain copolymerized acrylic unsaturated monomers copolymerized with other ethylenically unsaturated monomers. Acrylic unsaturated monomers include lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxy alkyl acrylates and methacrylates such as hydroxy ethyl and hydroxypropyl acrylates and methacrylates, as well as amino acrylates and methacrylates. The acrylic monomers can be copolymerized with ethylenically unsaturated monomers other than acrylic monomers. These Ethylenically unsaturated monomers can include, for example, those monomeric materials exhibiting ethylenic double bond unsaturation such as polymerizable vinyl, allylic, fumaric, maleic, or like ethylenically unsaturated double bond functionality (carbon-to-carbon unsaturation) which can be copolymerized with the acrylic double bond unsaturation in the acrylic unsaturated monomers. Ethylenically unsaturated monomers can include, for example, styrene alpha-methyl styrene and substituted alkyl styrenes, chlorostyrene, vinyl toluene, vinyl naphthalene, dibutyl maleate, butadiene, vinyl chloride, vinylidene chloride, acrylamide and acrylonitrile and similar ethylenically unsaturated monomers. The ethylenically unsaturated monomers can be copolymerized with those monomers containing acrylic unsaturation by free radical induced addition polymerization using peroxyorazo catalysts, common redox catalysts, ultra-violet radiation, or the like.

For example, the resin can be an acrylic latex emulsion binder available from Arkema Coating Resins of Cary. NC, under the trade designation ENCOR 412. A wall compound formulated with ENCOR 412 can demonstrate improved bond strength, durability, and resistance to UV light and moisture. Other suitable, commercially available latex resins include ENCOR 490 and UCAR 412, also available from Arkema Coating Resins. These commercial acrylic resins have substantially no $NH_3$ or ammonium salts contained in the latex.

The latex emulsion resin can comprise at least about 5, 10, 20, 30, or 40 percent, by weight of dry solids, of the wall compound in some embodiments. This and all other percentages by weight disclosed herein are based on the total weight of dry solids of the formulated weight of the wall compound unless otherwise noted.

In some embodiments, the resin or resin binder has a Tg of greater than 10 degrees C. In some embodiments, the resin or resin binder has a Tg of greater than 20 degrees C. It has also been found that resins having a glass transition temperature (Tg) below a certain temperature produce spackling compounds having more desirable primer-like properties when dried. That is, when resins having a Tg below a certain temperature are used in the wall compound, the dried compound will perform as though it has been primed. As a result, the dried compound when painted will closely match the appearance of a surrounding painted surface. In some embodiments, resins will have a glass transition temperature of less than about 25° C. less than about 20° C. or less than about 15° C. The term "glass transition temperature" is a term well known in the art and generally relates to a softening temperature indicative of the onset of long range translational motion of polymer molecules.

Filler

The wall compounds of the present disclosure further include a filler. In some embodiments, the filler is an inorganic filler system that comprises one or more inorganic fillers. Suitable natural inorganic fillers may include materials such as calcite, witherite, rutile, anatase, ilmenite, mica, sericite, perlite, talc, limestone, silica, barite, gypsum, calcined gypsum, kaolinite, montmorillonite, attapulgite, illite, saponite, hectorite, beidellite, stevensite, sepiolite, bentonite, pyrophyllite, diatomaceous earth, and the like. In some embodiments, the inorganic filler system includes synthetic inorganic fillers. The term "synthetic inorganic filler" as used herein includes any filler that has been transformed, regenerated, recrystallized, reconstituted, etc., from an original state which may be its naturally occurring, mined state into its current state by a chemical synthesis process (e.g., precipitated from solution, generated by flame hydrolysis, etc.) or by a physical synthesis process (e.g., precipitated from a gaseous phase, solidified by way of a sol-gel process, etc.). The term "synthetic inorganic filler" as used herein also includes any filler that has been substantially transformed from an original state (which may be its naturally occurring, mined state) into its current state by a physical synthesis process of being brought into an at least partially softened or molten state and then solidified by cooling, such that any substantially crystalline structure that may have existed in the natural state is substantially erased such that the material is now in a substantially amorphous form (e.g., comprising less than about 0.5 percent crystallinity by weight). Such processes may include, for example, melt processing, flame-fusion and the like.

Using the definitions provided above, synthetic inorganic fillers include, for example, so-called glass bubbles or microspheres (such as those available from 3M Company of St. Paul, MN, under the trade designation 3M Glass Bubbles), ceramic microspheres (such as those available from 3M Company under the trade designation 3M Ceramic Microspheres), synthetic clays (e.g., synthetic silicate clays such as those available under the trade designation Laponite from Southern Clay Products of Gonzales. TX), precipitated silica, fumed silica, vitreous silica, synthetic titanium dioxide (as made, for example, by the sulfate process or the chloride process), synthetic (precipitated) calcium carbonate (as made, for example, by passing carbon dioxide through a solution of calcium hydroxide), and the like. In this context, the term "synthetic inorganic fillers" includes such synthetic inorganic fillers as have been modified to include organic surface groups, coatings, etc.

In certain embodiments, the synthetic inorganic fillers used herein comprise a bimodal particle size mixture of larger synthetic inorganic filler particles and smaller synthetic inorganic filler particles. In various embodiments, the synthetic inorganic filler used herein comprises a bimodal particle size mixture of synthetic inorganic filler particles comprising a particle size ratio of larger size filler to smaller size filler (as obtained by rationing the medium particle size of the two filler populations) of at least about 5:1. Other embodiments of the present disclosure lack a bimodal distribution and feature one average size of filler particles. Further considerations for a bimodal distribution of filter particles can be found in U.S. Pat. No. 8,877,840 (Gozum et al.), incorporated herein in its entirety.

In some embodiments, such synthetic inorganic fillers are comprised of substantially spherical particles. In this context, the term "substantially spherical" denotes that a substantial majority of the particles are spherical except for such occasional deviations, deformities, etc., as are known to those of skill in the art to be occasionally encountered in the manufacturing processes used to produce the particles (for example, somewhat misshapen particles may occasionally be produced, two or more particles may agglomerate or adhere to each other, and so on).

Suitable substantially spherical synthetic inorganic fillers as defined herein include so-called glass bubbles and ceramic microspheres. Such glass bubbles can be synthesized, for example, by a process as described in U.S. Pat. Nos. 3,365,315 (Beck et al.) and 4,391,646 (Howell), incorporated herein in their entirety. Such ceramic microspheres can be synthesized, for example, by sol-gel processes, as described for example in U.S. Pat. Nos. 3,709,706 (Sowman) and 4,166,147 (Lange et al.), incorporated herein in their entirety. Other methods potentially useful for making ceramic particles and/or microspheres are described in, for example, U.S. Pat. No. 6,027,799 (Castle), incorporated herein in its entirety. Other suitable synthetic and substantially spherical filler particles that can be used alone or in combination with glass bubbles and ceramic microspheres include polystyrene beads, polyacrylate beads, polyolefin beads or any combination thereof.

In presently preferred wall compound formulations, the filler includes calcium carbonate and one of glass bubbles and polymeric microspheres.

In various embodiments, the inorganic filler system comprises at least about 15%, 20%, or 25%, by weight of dry solids, of the wall compound. In further embodiments, the inorganic filler system comprises at most about 55%, 65%, or 80% by weight of dry solids, of the weight of the wall compound as formulated The calcium carbonate can be included in any suitable amount. In some embodiments, the calcium carbonate is included in an amount from about 0% to about 80%, by weight of dry solids, such as from about 0.01% to about 70%, from about 0.01% to about 60%, from about 0.1% to about 50%, or from about 0.1% to about 40%, by weight of dry solids of the total wall compound as formulated.

The wall compound typically comprises from about 1 wt. % to about 50 wt. %, about 5 wt. % to about 30 wt. % and about 10 wt. % to about 25 wt. % of the synthetic, substantially spherical filler, by weight of dry solids of the total wall compound as formulated.

In some embodiments, inorganic fillers such as clays can control, in cooperation with pH Control Agents recited below, the amount of time over which a color change tales place. Particularly useful in this regard is Attagel-19, made from a specialty processed attapulgite, a hydrated magnesium aluminosilicate and a principle member of the fuller's earth family of clay minerals: $(Mg \cdot Al)5Si8O20 \cdot 4H2O$. Other clays listed above may also be useful. Attapulgites tend to reduce the amount of time necessary for the color change to occur.

Where provided in the inorganic filler system, the color change time modifying filler is included at an amount from about 0.01% to about 5%, by weight of dry solids, such as from about 0.1% to about 5%, from about 0.01% to about 2%, from about 0.1% to about 2%, by weight of dry solids of the total wall compound as formulated.

Dryness Indicator

The wall compounds of the present disclosure include a sufficient concentration of color changing dryness indicator (i.e., pH color change indicator) to provide the desired color changing characteristics. The color of the dried wall compound post application is desirably not easily distinguishable from a typically white wall substrate to which the compound has been applied. Potentially suitable pH indicators include thymolphthalein, alizarin yellow, thanoate, p-napthobenzein, cresol red, thymol blue, 2,4,6 trinitrotoluene, metacresol purple, phenolphthalein, ethyl bis(2,4-dinitrophenyl)acetate; p-nitrophenol, -nitrophenol; m-dinitrophenol; 1,3,5-trinitrophenol; and 2,4,6-trinitrophenol.

Presently preferred dryness indicators are phthalein-containing: phenolphthalein, tetrabromophenoltetraiodophthalein, tetraiodophenoltetraiodophthalein, o-cresolphthalein, dibromothymolphthalein, thymolphthalein, thymoltetrachlorophthalein, and dibromothymoltetrachlorophthalein. Dibromothymolphthalein can be prepared according to the methods disclosed in JP53038534. Thymoltetrachlorophthalein. and dibromothymoltetrachlorophthalein can be prepared according to the Journal of the American Chemical Society 1927, 49, 3, 826-830. The latter four thy molphthalein-based pH indicators and o-cresolphthalein, presenting a blue to white change upon drying (except for o-cresolphthalein which presents a purple to white change upon drying), are particularly preferred at present. Thymolphthalein changes to a blue color in water at a pH of about 9.3 and is colorless below a pH of about 9.0; wall compounds containing thymolphthalein typically require a pH at or above about 13.0. Dibromothymolphthalein changes to a blue color in water at a pH of about 8.8 and is colorless below a pH of about 8.5; wall compounds containing dibromothymolphthalein typically require a pH at or above about 12.5. Thymoltetrachlorophthalein changes to a blue color in water at a pH of about 9.2 and is colorless below a pH of about 8.8; wall compounds containing thymoltetrachlorophthalein typically require a pH at or above about 13.5.

Dibromothymoltetrachlorophthalein changes to a blue color in water at a pH of about 8.4 and is colorless below a pH of about 8.3; wall compounds containing dibromothymoltetrachlorophthalein typically require a pH at or above about 12.5. O-Cresolphthalein changes to a purple in water at a pH of about 8.2 and is colorless below a pH of about 7.9; wall compounds containing o-cresolphthalein typically require a pH at or above about 12.5.

The dryness indicator can be included in any suitable amount, e.g., to achieve a demonstratable change in color. In some embodiments, the dryness indicator is included in an amount from about 0.0001% to about 10%, by weight of the dry solids, such as from about 0.001% to about 5%, from about 0.01% to about 3%, from about 0.01% to about 2%, or from about 0.1% to about 1%, by weight of dry solids in 5 of the total wall compound as formulated.

Inhibitor

The soda-lime-borosilicate glass composition of typical glass bubbles provides excellent water resistance to create more stable compound at designable conditions. Their low alkalinity gives glass bubbles compatibility with most resins, stable viscosity, and long shelf life in PH lower than 10. As suggested above, the use of synthetic inorganic fillers and thymolphthalein-based dryness indicators in wall compounds can, over time, result in filler corrosion or degradation, lack of formulation stability, and failure of the compound to retain color on shelf or change color on the wall. Alkaline chemicals leach Borax (sodium borate) out from the surface of soda-lime-borosilicate glass in a pH range of about 11 to about 13. The sodium borate not only reduces the pH but deleteriously reacts with common phthalein-containing indicators.

The wall compounds of the present disclosure accordingly benefit from the inclusion of corrosion inhibitors designed to react with Borax and prevent loss of filler material, alkalinity, and color. Suitable inhibitors release a metal ion that reduces or slows the formation of corrosive or acidic compounds, such as Borax. Suitable metal ions include beryllium, calcium, barium, magnesium, zinc, strontium, and aluminum. The inhibitor may be provided during formulation as, for example, calcium chloride, barium hydroxide, calcium oxide, magnesium oxide, zinc hydroxide, aluminum hydroxide, zinc sulfate, zinc sulfate hydrate, aluminum sulfate, aluminum ammonium sulfate, aluminum potassium sulfate, or any combination thereof, with hydroxides and oxides of the inhibitor ion being presently preferred. The ion may also be introduced as part of a natural filler. In presently preferred implementations, the wall compounds of the present disclosure include at least one of barium or calcium cations, typically from barium hydroxide and calcium chloride. Barium, in particular, may not only inhibit corrosion of borosilicate glass but also assist in stabilizing thymolphthalein based pH color change indicators.

Without wishing to be bound by theory, the metal ion inhibitors ions can act "chemically." i.e. they affect the course of elementary processes of glass bubble corrosion; they do not only form protective layers which would act as a mechanical barrier but also specifically reduce the rate of corrosion in solution.

In some embodiments of the present disclosure, the wall compound includes neither spherical synthetic inorganic nor polymeric filler particles. Such formulations can still contain stabilizing cations such as barium, calcium, or others described above that preserve alkalinity and promote color fastness.

The inhibitor can be included in any suitable amount to preserve alkalinity and promote color fastness. In some embodiments, the inhibitor is included in an amount from about 0.01% to about 10%, by weight of the dry solids, such as from about 0.01% to about 5%, from about 0.01% to about 3%, from about 0.1% to about 2%, or from about 0.1% to about 1%, by weight of dry solids of the total wall compound as formulated.

pH Control Agent

In some embodiments, the wall compounds of the present disclosure can include an activator or pH control agent to preserve the alkalinity of the wall compound before application (e.g., a thymolphthalein indicator will not appear sufficiently blue a pH less than about 12.5). For example, and as described in greater detail below, in some embodiments, formulation of the wall compound can include adjustment of the pH to about 12.5 to 13.5 to allow for stability of pH indicator agent. Where provided, the activator or pH control agent can assume a variety of forms known in the art and appropriate for use with a wall compound, and for example can be NaOH, KOH, $K_2CO_3$ and other bases used to regulate pH of the wall compound to alkalinity. In formulations including barium hydroxide as an inhibitor, for example, the inclusion of a second pH control agent is not necessary, given the tendency of barium hydroxide to increase alkalinity. The pH control agent can be provided diluted or undiluted.

Where provided, the pH control agent is included at an amount from about 0.01% to about 5%, by weight of dry solids, such as from about 0.1% to about 5%, from about 0.01% to about 2%, from about 0.1% to about 2%, by weight of dry solids of the total wall compound as formulated.

Thickener

The wall compounds of the present disclosure include a thickener package. The thickener package provides an enhanced initial viscosity (i.e., viscosity under low or no shear stress) for the wall compounds such that the compound does not excessively sag, slump, or run (e.g., when applied to a vertical wall) but yields to flow easily once sufficient shear stress is applied.

Suitable thickeners are compatible with the composition, meaning that when the thickener is combined with the resin binder, a smooth-flowing, homogeneous liquid mixture is formed, from which, a dried coating is obtained at room temperature. Addition of the thickener typically should not coagulate the composition (e.g., form semi-solid or solid clumps and/or gel particles). Preferably, the thickener imparts pseudoplastic (shear thinning) behavior to the composition, meaning that the viscosity decreases with increasing shear rate. In some embodiments, the thickener imparts "short viscosity" to the composition, meaning that a filament of the composition breaks at very short lengths and the composition does not form "strings" when drawn out. The amount of thickener required in the composition depends on the thickener chemistry and viscosity desired.

The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Other examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; and styrene-maleic anhydride terpolymers (SMAT); associative thickeners such as hydrophobically modified ethoxylated urethanes (HEUR); hydrophobically modified polyethers ("HMPE"); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Associative thickening may involve dynamic, non-specific interactions of hydrophobic end groups of a thickener molecule with itself and with other components of a formulation.

Certain natural or synthetic inorganic fillers (for example, clays such as attapulgite, bentonite, montmorillonite, illite, kaolinite, sepiolite, the synthetic clay available under the trade designation Laponite from Southern Clay Products, etc.), are also known to exhibit a thickening (e.g., viscosity-increasing) effect when dispersed in water and can be used, in certain implementations, in the thickener package.

The wall compounds of the present disclosure comprise a thickener package including at least one cellulosic thickener. The use of cellulosic thickeners in alkaline wall compound formulations may prevent the degradation of the pH color change indicator and preserve the ability of the wall compound to exhibit an observable color change on drying. Without wishing to be bound by theory, certain cellulosic thickeners act as non-ionic inhibitors of a reaction between thymolphthalein-based pH indicators and Borax. In some implementations, the inclusion of a cellulosic thickener not only preserves the color in heat aging but increases the speed of the change in color once the patch has been applied. In presently preferred implementations, the cellulosic thickener is HEC.

The thickener package can be included in any suitable amount, e.g., to achieve a desired viscosity. In some embodiments, the thickener package is included in an amount from about 0.01% to about 25%, by weight of dry solids, such as from about 0.01% to about 20%, from about 0.01% to about 4%, from about 0.1% to about 2%, or from about 0.1% to about 1%, by weight of dry solids of the total wall compound as formulated.

The wall compound typically comprises from about 0.001 wt. % to about 10 wt. %, about 0.01 wt. % to about 0.6 wt. % and 0.05 wt. % to 0.40 wt. % of the cellulosic thickener by weight of dry solids of the total wall compound as formulated.

Below this range, the thickener may not provide sufficient increase in viscosity, the composition may be too runny or insufficiently stable for wallboard joining applications, and the composition may not exhibit a demonstrable color-change. Above this range, the composition may be too viscous to spread or manufacture.

Alternatively, other thickeners conventionally employed with wall compounds may be used, for example to provide an increased viscosity of the wall compounds such that the compound does not excessively sag, slump or run (e.g., when applied to a vertical wall). HASE thickeners, when used in combination with cellulosic thickeners in a thickener package, are particularly well suited for use in the wall compounds of the present disclosure.

The wall compound typically comprises from about 0.001 wt. % to about 1 wt. %, about 0.01 wt. % to about 0.6 wt. % and 0.05 wt. % to 0.25 wt. % of the HASE thickener, by weight of dry solids of the total wall compound as formulated.

While various ones of thickeners described above may be used with the wall compounds of the present disclosure, it has been found that clay-type thickeners are too dense for use in the wall compounds described herein. Accordingly, in presently preferred implementations, the thickener package does not include clay-type thickeners.

Optional Ingredients

Wall compounds of the present disclosure may optionally include one or more additional components for various purposes. Exemplary additives include, but are not limited to, adhesion promoters, activators, smoothing agents, anti-foaming agents, solvents, dispersing agents, surfactants, humectants, colorants, and preservatives (such as fungicides).

For example, an adhesion promoter can be employed to provide secure attachment of the wall compound to a wall and/or ceiling surface. The adhesion promoter can assume a variety of forms as known to those of skill in the art, and can include a titanium alkoxide adhesion promoter, such as an adhesion promoter available from Chartwell International, Inc. under the trade designation B-515.71W. In some embodiments, the wall compounds may include less than about 1 percent by weight of an adhesion promoter.

In some embodiments, the wall compounds of the present disclosure may include one or more smoothing agents, such as one or more organic ether smoothing agents, found to advantageously affect the consistency of the compound. In some embodiments, the optional smoothing agent, such as an organic ether smoothing agent, at the concentrations disclosed herein can impart a smooth consistency to the wall compound (absent the smoothing agent, the wall compound may take on a crumblier appearance) such that the wall compound is more easily spreadable it does not run, sag, slump or crumble, once applied, e.g., to a vertical wall. In contrast to the above-described thickeners, such optional smoothing agents appear to function to reduce the apparent viscosity of the wall compound rather than to increase it (while, again, not causing unacceptable sagging or slumping). Some examples of acceptable smoothing agents useful with the wall compounds of the present disclosure are described in U.S. Pat. No. 8,507,587, the teachings of which are incorporated herein in their entirety.

In various embodiments, the wall compounds described herein may include one or more organic ether smoothing agents. In some embodiments, the organic ether smoothing agent(s) is/are present in total in an amount of at most about 2.5 percent, at most about 1.5 percent, or at most about 0.5 percent, by weight of dry solids the total wall compound as formulated. In various additional embodiments, the one or more organic ether smoothing agents are present in total in an amount of at least about 0.025 percent, at least about 0.05 percent, or at least about 0.15 percent, by weight of dry solids. For these purposes, the smoothing agents and/or other solvents are considered part of the solids, but added water is not.

Suitable organic ether smoothing agents may be chosen, for example, from those products available from Dow Chemical under the trade designations DOW P-Series Glycol Ethers and DOW E-Series Glycol Ethers (including, for example, various products available under the trade designations DOWANOL. CARBITOL, and CELLOSOLVE), and mixtures thereof. In some embodiments, organic ether smoothing agents are chosen from organic ethers that comprise exactly one hydroxyl group and exactly one ether group. This group includes, for example, propylene glycol butyl ether (available from Dow Chemical under the trade designation DOWANOL PnB), propylene glycol methyl ether (available from Dow Chemical under the trade designation DOWANOL PM), as well as other products available from Dow Chemical under the DOWANOL. CARBITOL, and CELLOSOLVE trade designations, and mixtures thereof. In other embodiments, optional smoothing agents are chosen from organic ethers that comprise exactly one hydroxyl group and exactly two ether groups. In yet other embodiments, optional smoothing agents are chosen from organic ethers that comprise exactly one hydroxyl group and exactly three ether groups. In yet other embodiments, optional smoothing agents are chosen from organic ethers that comprise at least one ether group and that do not contain any hydroxyl groups.

In addition to the components discussed above, other components may be added to the wall compound. These may include, for example, water, which may be added at the end of the production process, for final adjustment of e.g., viscosity. Thus, in certain embodiments, water (in addition to the water optionally present in the aqueous acrylic latex binder emulsion) may be added to the formulation.

The wall compounds of the present disclosure can further optionally include fibers. In some embodiments, the wall compounds include two (or more) different types of fibers. In some embodiments, the fibers are selected in conjunction with the selected thickener to impart yield stress behavior and/or pseudoplastic behavior into the wall compound, as well as to enhance performance of the wall compound (if used as a joint compound) in joining adjacent wallboards or repair defects in a wall surface.

In some embodiments, the fibers of the present disclosure include a mixture of hydrophobic dry fibrillated polyethylene fibers and hydrophilic rayon fibers. The dry fibrillated polyethylene fibers can have a nominal size that is less than a nominal size of the hydrophilic rayon fibers. For example, the hydrophobic dry fibrillated polyethylene fiber can have nominal dimension on the order of 15 microns in diameter and 0.55-0.80 mm in length, whereas the hydrophilic rayon fibers can have nominal dimensions on the order of 4.5 denier by 0.5 inch. The dry fibrillated polyethylene fibers as combined with the thickener provide one or more of general reinforcement, crack resistance, reduced shrinkage, viscosity control, particle suspension, shear thinning, and improved dimensional stability without absorbing other ingredients or reducing shelf life. The hydrophilic rayon fibers as combined with the thickener provide one or more of porosity control and absorbency, and reinforcement.

In some embodiments, the wall compound of the present disclosure may include less than about 1 percent by weight of the hydrophobic dry fibrillated polyethylene fibers (or equivalent fibers), and further include less than about 1 percent by weight of the hydrophilic rayon fibers (or equivalent fibers). In related embodiments, the wall compound of the present disclosure may include a greater amount (by weight) of the hydrophilic rayon fiber (or equivalent fibers) than the hydrophobic dry fibrillated polyethylene fibers (or equivalent fibers). Other considerations for selecting fibers and formulating for pseudo-plastic behavior may be found in U.S. Pat. No. 10,273,185 (Gozum et al.).

In some embodiments, the fiber(s) is/are present in total in an amount of no greater than about 3 percent, no greater than about 2 percent, or no greater than about 1 percent, by weight of dry solids the total wall compound as formulated.

The components may be stabilized in a bulk water phase by employing one or more surfactants. In various embodiments, the surfactant is anionic in nature and is the structure thereof not otherwise particularly limited. Non-limiting examples of anionic surfactants include ammonium, sodium, lithium, or potassium salts of lauryl sulfonic acid, dioctyl sodium sulfosuccinic acid, ammonium, sodium, lithium, or potassium salts of perfluorobutanesulfonic acid, ammonium, sodium, lithium, or potassium salts of perfluorooctanesulfonic acid, ammonium, sodium, lithium, or potassium salts of perfluorooctanoic acid, sodium dodecyl sulfate, sodium dodecylbenzenesulfonate, sodium laureth sulfate, sodium lauroyl sarcosinate, sodium myreth sulfate, sodium pareth sulfate, ammonium, sodium, lithium, or potassium salts of stearic acid, and combinations of one or more thereof. A dispersing agent may be added to the wall compound composition for wetting and/or stabilization purposes. The dispersing agent can be a non-ionic or an anionic compound, typically a polymer, such polyvinyl pyrrolidone. Such dispersing agents are known in the art. The proportion of dispersing agent and/or surfactant will typically depend upon the dispersant or surfactant or combinations used and the particular wall compound composition.

The wall compounds described herein may further include humectants to control loss of water or other solvent during use or storage. Suitable humectants for use in the compositions include polyfunctional alcohols, such as propylene glycol, glycerol, polyglycerols, trimethylol propane, polyether glycols, sorbitol and/or low molecular weight starch hydrolyzates which have been converted into the corresponding polyols by reduction with hydrogen, and mixtures thereof.

Other additives that may be present include preservatives that may have advantageous effects on the wall compound during storage and may also serve to minimize the degree to which mold or fungus may grow on the dried wall compound. Thus, in certain embodiments, the wall compounds disclosed herein can optionally comprise at least about 0.1, 0.2 or 0.3 percent by weight of dry solids a preservative or preservatives. In further embodiments, the wall compounds disclosed herein optionally comprise at most about 0.8, 0.6 or 0.4 percent by weight of dry solids a preservative or preservatives. Suitable preservatives include, for example, those available under the designation MERGAL 186 and POLYPHASE P20T, from Troy Corporation of Florham Park. NJ. The wall compounds disclosed herein can also comprise dust reducing additives, which in some circumstances may serve to further reduce the quantity of airborne dust particles generated when sanding the dried, hardened wall repair compound. Exemplary additives may include oils (such as mineral oils, vegetable oils, and animal oils), waxes (including natural and synthetic waxes), and the like.

To enhance the ability of the wall compound to "hide" or blend in with the visual appearance of the wall or ceiling surface upon drying, the wall compound may also optionally include one or more colorants or primers. One suitable colorant or primer is, for example, titanium dioxide. While not wishing to be bound by theory, it is believed that titanium dioxide reflects light and thereby effectively hides differences in the substrate color/appearance when added to the wall compound formulation. Another exemplary suitable colorant is carbon black. Specific commercially available colorants suitable for use in the wall compound of the present disclosure include MONARCH 120 carbon black available from Cabot Corporation of Boston, MA and TI-PURE R700 titanium dioxide available from DuPont Chemicals of Wilmington. DE. In some embodiments, where provided, the amount of colorant is greater than 8% by weight. In some embodiments, the amount of colorant is less than about 20 percent by weight. In some embodiments, the amount of colorant is less than about 10 percent by weight. In some embodiments, the amount of colorant is less than 1 percent by weight, all percentages being of dry solids of the total wall compound as formulated.

Yield Stress & Pseudoplastic Behavior

The wall compounds of the present disclosure can be, under certain implementations, formulated to exhibit yield stress behavior. As used herein, the terms "yield stress fluid" and "yield stress behavior" refers to a material or composition that possesses the properties of a solid in the absence of shear stress and the properties of a fluid (e.g., liquid) under sufficient shear stress. In some embodiments, the wall compounds of the present disclosure exhibit pseudoplastic-type behavior in addition to or in lieu of yield stress behavior. As used herein, the term "pseudoplastic" refers to a material or composition that exhibits shear thinning without significant initial resistance to deformation. The wall compounds behave as non-Newtonian fluids under most use conditions but may also show linear (Newtonian) behavior at the highest levels of stress and shear rate.

The yield stress behavior promotes easy spreading of the wall compound on to a surface (such as a surface adjacent a wallboard joint), but once the user has stopped spreading, the wall compound quickly stops flowing. In some embodiments, the yield stress behavior is achieved by using an associative thickener package in combination with hydrophobic dry fibrillated polyethylene fibers (or similar fiber material), hydrophilic rayon fibers (or similar fiber material), and suitable substantially spherical synthetic inorganic fillers (e.g., glass bubbles).

In some embodiments, the wall repair compounds of the present disclosure can have a yield stress value or yield value (the force that must be applied to a fluid layer before any movement is produced), meaning it has an initial resistance to flow under stress but then is shear thinning, and when used, exhibits "cling." meaning it has the ability at rest, to return to a pseudo-plastic or thixotropic gel. However, at stresses below the yield value, the viscosity increases substantially and resists flow, which is useful for preventing sagging or running after application. In presently preferred implementations, the yield value is sufficiently high to prevent sagging or running before or after spreading, and yet does not inhibit the mixing or application of the wall compound.

In some embodiments, the wall compound can have a yield stress value of at least 200 Pa, in some embodiments, at least 350 Pa, in some embodiments at least 500 Pa, in some embodiments at least 600 Pa, in some embodiments at least 750 Pa, in some embodiments at least 1000 Pa.

In some embodiments, the wall compound can have a yield stress value of no greater than 2000 Pa, no greater than 1750, no greater than 1500 Pa, and in some embodiments no greater than 1250 Pa. For wall compounds particularly useful as joint compounds, the yield stress value is typically less than 1000 Pa. This can help ensure the compound exhibits the desired fluid behavior upon shear stress levels that may be easier for a user to generated by hand or tool.

In presently preferred implementations particularly suitable for use in joint filling, the wall compounds of the present disclosure have a relatively low yield stress value combined with a relatively high viscosity at low to no shear and a rapid transition to low viscosity upon application of sufficient force. It is desirable to have a high initial viscosity in order that the compound can be as strong and thick as possible as applied to seams and yet have the lowest possible viscosity so as to allow the compound to be easily spread across wallboards and joints. Considerations for formulating wall compounds to exhibit yield stress behavior may be found, for example, in U.S. Patent Publication No. 2020/0290927 (Wang).

The wall compounds are suitable for filling a joint seam, with or without reinforcement tape. In particularly advantageous embodiments, the wall compounds can fill a seam and provide a monolithic surface without the need for joint reinforcement tape. The wall compounds of the present disclosure can be employed to repair a plethora of wall surface imperfections or defects (e.g., holes, cracks, etc.). Further, the wall compounds of the present disclosure featuring fibers are well-suited to be applied into a larger hole (e.g., hole with a major dimension of at least 2 inches) in a vertical wall surface (e.g., following placement of a backing material or panel onto a backside of the wall in a region of the hole).

In some embodiments, the wall compound of the present disclosure can be provided to an end user as part of a kit. Exemplary kits can further include one or more tools, optionally a backing device for establishing a scaffolding structure "behind" the hole for receiving the wall compound (e.g., non-limiting examples, of which are described in U.S. Pat. No. 9,828,782, entitled "Wall Hole Repair Device. Kit. and Method", etc.

Methods of Use

The wall compounds of the present disclosure can be formulated and applied in a manner akin to conventional spackling compounds, including the user spreading a quantity of the wall compound into the hole and along an interior or exterior wall surface surrounding the hole with a spreading tool. After the wall compound is applied to a wall, the water evaporates over a period of time resulting in the formation of a dried, hardened material which can be sanded, painted, etc. The present wall compounds can be over a surface and/or also filling in gaps, seams or joints. The wall compounds of the present disclosure may also include patching indentations, gaps, cracks and/or other imperfections or defects in a wall substrate.

In some embodiments, the wall compounds may be used with a conventional caulking tool. In other embodiments, the wall compounds of the present disclosure can be provided to a user with a reduced water content (akin to a dough material). The corresponding methods of use of the present disclosure include the user rolling a volume of the dough-like wall compound to shape with the user's hand(s), and then inserting and pressing the shaped compound into the hole or other defect.

The wall compounds of the present disclosure are also well suited for adhering construction panels and fortifying joints. The wall compounds can be used without joint reinforcement tape, which saves time and makes wall installation more accurate and reliable. The present wall compounds are thus suitable in installation of various construction panels. These panels include, but are not limited to, gypsum wallboards, paperless gypsum panels and gypsum and/or cement-based tiles. In some embodiments, joint seams are filled with one or more layers of wall compound and the composition is allowed to self-level and create a polymerized matrix over the joint and some panel surface area. The seam can be then sanded if needed and is ready for decorative painting or another wall covering.

In some embodiments, one or more finishing compounds are applied to surface of a wall compound matrix. The finishing compound can provide a smoother outer surface than certain implementations of wall compound, potentially reducing the amount of time spent sanding or otherwise improving the appearance of the joint seam. Finishing compounds of the present disclosure generally include a latex resin, a thickener package, and a synthetic filler material. Other optional ingredients (such as smoothing agents, colorants, primers and others listed above) may be included in various other embodiments. Finishing compounds typically lack fibers of the type described herein, as fibers can potentially contribute to a rougher or uneven surface upon drying. Suitable finishing compounds are described, for example, in U.S. Pat. No. 8,507,857 (Gozum et al), entitled "Lightweight Wall Repair Compounds". For example, a finishing compound may include about 45 wt. % resin, about 25% synthetic filler, about 0.2 wt. % thickener, water, and other additives, each by weight of the total finishing compound as formulated.

Compounds of the present disclosure exhibit a human-observable change in color between the first color of a wall compound when first applied to the surface and the second color of the compound after it has been sanded. As used herein, a "human-observable change in color" means the Delta E ($\Delta E$), as calculated below according to Formula I below, between the color of a wall compound when first applied to a surface and the second color of the compound after it has dried is at least 1. In some embodiments, the Delta E ($\Delta E$) is at least 2, and in some embodiments at least 3.

Whiteness is an attribute of colors of high luminous reflectance and low purity, situated in a relatively small region of the color space. Lightness describes the overall intensity of the color in terms of how light or dark a color is. Under the Commission Internationale de l'Eclairage L*a*b* scoring system, the color white is distinguished by its high lightness, and surface having a perfectly white appearance has an L* of 100 (or greater if measured only at a specific view angle). Delta E ($\Delta E$) represents a difference in color between the first color of a wall compound before application and the surface and the second color (typically white) of the compound after it has dried.

Delta E ($\Delta E$) can be calculated according to the formula (I) as follows:

$$\Delta\sqrt{\{\text{square root over} (L1^* - L2^*)^2 + (a1^* - a2^*)^2 + (b1^* - b2^*)^2)\}} \qquad \text{(I)}$$

In some other embodiments, the wall compound can be pre-made and stored on a shelf until needed. In other alternatives, the wall compounds can be prepared from a kit at a construction site by mixing components such as a resin, a thickener package, synthetic filler, and an inhibitor, as well as other components together with water.

EXAMPLES

In order that aspects of the present disclosure can be more fully understood, the following examples are set forth. It should be understood that these examples are for illustrative purposes only, and are not to be construed as limiting the present disclosure in any manner.

Shelf Stability Test Method

Aqueous wall compound formulations are sealed in glass containers and placed in 120° F. oven for at least 2 weeks. Once removed, the samples are visually inspected for a loss of color. Wall compounds that retain their initial color are said to be "shelf-stable".

Materials

A glossary of materials used in the Examples is provided in Table 1.

TABLE 1

| RM | Chemical Name | Vendor |
|---|---|---|
| | Materials | |
| ENCOR 412 | Acrylic Emulsion Polymer, ammonia-free (47% by weight solids, in water) | Arkema Emulsion Systems, Cary, NC |
| Ba(OH)$_2$ | Barium Hydroxide, inhibitor | Sigma Aldrich |
| CaCl$_2$ | Calcium Chloride, inhibitor | Sigma Aldrich |
| Ca(OH)$_2$ | Calcium Hydroxide | Sigma Aldrich |
| DOWANOL PnB Glycol Ether | Propylene Glycol n-Butyl Ether | Dow, Midland, MI |
| THIXOL 53 L | Liquid acrylic self-associative thickener (30% by weight solids, in water) | Coatex (Arkema Group), Chester, SC |
| HEC | Hydroxyethyl Cellulose | Dow, Midland, MI |
| RHODOLINE FT 100 | Freeze thaw stabilizer Poly(oxy-1,2-ethanediyl), alpha. [tris(1-phenylethyl) phenyl]-.omega.-hydroxy- | Solvay USA, Inc., Princeton, NJ |
| RHODOLINE 622 | Defoamer Oil/hydrophobic silica blend, containing additional inorganic hydrophobes | Solvay USA Inc., Princeton, NJ |
| HUBERCARB W4 | Calcium Carbonate | J. M. Huber Corporation, Edison, NJ |
| NaOH | Sodium Hydroxide, pH adjuster | Sigma Aldrich |
| Blue TTL | Thymolphthalein blue color indicator | Sigma Aldrich |
| Blue TTLD | Dibromothymolphthalein blue color indicator | Prepared in accordance with patent publication JP53058534A |
| o-cresolphthalein | Purple color indicator | Alfa Aesar, Tewksbury, MA |
| K20 Glass Bubbles | Glass Bubbles | 3M Company, St. Paul, MN |
| SPEX-LITE MB 1755 | Polymer Microspheres | SpexLite, Westlake, OH |
| TCPA | Tetrachlorophthalic anhydride, CAS number 117-08-8 | Thermo Fisher Scientific, Ward Hill, MA |
| Methanesulfonic acid | Methanesulfonic acid | Thermo Fisher Scientific |
| Thymol | Thymol, CAS number 89-83-8 | Spectrum Chemical, Gardena, CA |

TABLE 1-continued

| | Materials | |
| --- | --- | --- |
| RM | Chemical Name | Vendor |
| Heptane | Heptane | J. T. Baker, Phillipsburg, NJ |
| Ethyl acetate | Ethyl acetate | EMD Millipore, Billerica, MA |
| Ammonium acetate | Ammonium acetate | VWR, West Chester, PA |
| NaOH | Sodium hydroxide | VWR |
| Ethanol | Ethanol, denatured | VWR |
| Bromine | Bromine | Thermo Fischer |
| Blue TTLTC | Thymoltetrachlorophthalein | Preparation below |
| Blue TTLDBTC | dibromothymoltetrachlorophthalein | Preparation below |
| Attagel-19 | Specialty processed attapulgite $(Mg,Al)5Si8O20 \cdot 4H2O$ | BASF Corporation, Charlotte, NC |

Preparation of Thy Moltetrachlorophthalein (Blue TTLTC):

The reaction was run in a manner similar to that for products in Tetrahedron Letters Volume 50 (2009), pages 6261-6263, but purified in a different fashion.

To a 250 mL three-necked flask equipped with an overhead stirrer and later a reflux condenser was charged with 30.00 g (0.1019 mol) tetrachlorophthalic anhydride, 33.10 g (0.2204 mol) thymol, and 56.67 g (0.5897 mol) methanesulfonic acid and the reaction was heated to 84° C. for 5 hours, then allowed to cool to room temperature with stirring to yield a blue solution. The blue solution was then poured over about 1 kg of 50:50 water and ice with stirring which changed the material into a tan solid. The material was filtered and the solids were washed with additional water. The solids were dried in a recrystallizing dish vacuum oven at about 50° ° C. overnight, to provide about 53 g of solids, which were evaluated along with the thymol and tetrachlorophthalein by 1H and 13C NMR and by thin layer chromatography ("tlc") using a silica gel plate and an eluent of 65:35 heptane:ethyl acetate. The tlc has three main spots of approximate Rf values of 0.6, 0.3, and 0.2 to 0. This material was powdered with a pestle in the dish, and 52.6 g were transferred to a 250 ml roundbottom equipped with overhead stirring and a reflux condenser, along with 157.8 g heptane. This mixture was heated to boiling and after a few minutes of stirring, the solids were largely undissolved. The mixture was filtered hot and the collected solids were dried in a 55° ° C. vacuum oven over 1 h to provide 30.6 g of dry product. This product was evaluated by 1H and 13C NMR and by tlc using a silica gel plate and an eluent of 65:35 heptane:ethyl acetate. The heptane treatment effectively removed the thymol, tlc spot 0.6. This was confirmed by the NMR data also.

Next 17.8 g of the above-described product was combined with 9.64 g from a similarly processed lot and charged to a 1 L roundbottom along with 10.0 g of ammonium acetate in 290.0 g of water, and heated overnight at 45 C. A 20.0 g aliquot of the solution at ~pH 4 was brought to pH 11 with 0.1N NaOH. It was filtered and dried for 1 h at 55° C. under vacuum to yield about 1.0 g of solids. This product was evaluated by 1H and 13C NMR and by tlc using a silica gel plate and an eluent of 65:35 heptane:ethyl acetate. Both NMR and tlc indicated that the tetrachlorophthalein level was reduced, but that it was still present. What remained of the 1 g sample was added back to the reaction, and after 2 days, the reaction at pH 4 was brought to ph 11 with 162 g of 0.1N NaOH, and allowed to stir for 38 min. The reaction was filtered and solids washed with 200 g of hot tap water and 100 g of RT deionized water. The collected solids were dried at 60 C for 3 h 15 min. yielding 12.06 g solids which were evaluated by 1H and 13C NMR and by tlc using a silica gel plate and an eluent of 65:35 heptane:ethyl acetate, and found to be quite pure and free from tetrachlorophthalein.

Preparation of Dibromothymoltetrachlorophthalein (Blue TTLDBTC):

A jar equipped with stirbar was charged with 2.5 g of solid thymoltetrachlorophthalein (0.0044 mol, 568.34 MW), 31.25 g ethanol and stirred at RT to dissolve the solids. Next 2.0 g (0.0125 mol) bromine was added over 10 see and allowed to stir at RT for 2 hours 15 min. The reaction was checked by tlc on silica gel plates using 65:35 heptane:ethyl acetate as the eluent. The starting material at Rf 0.56 was not visible, and two new spots at Rf 0.65 (faint) and 0.75 (strong), likely corresponding to the monobromothymoltetrachlorophthalein and the desired dibromothymoltetrachlorophthalein respectively, appeared. Then 0.3 g (0.00188 mol) bromine was added and tlc analysis showed only the desired spot at Rf 0.75. The material was analyzed by 1H and 13C NMR in d8-THF and found to be of >95% purity. The material was dried at 50° C. under vacuum to yield 3.1 g of solids. The material is believed to be of the structure:

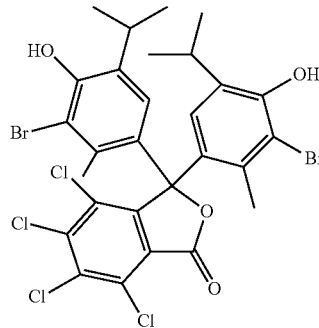 [SMILES: Cc1c(C2(c3cc(C(C)C)c(O)c(Br)c3C)OC(=O)c3c(Cl)c(Cl)c(Cl)c(Cl)c32)cc(C(C)C)c(O)c1Br]

Examples 1-7

Batches of wall compounds were prepared by the following general method. The following equipment was provided: a high shear mixer equipped with a Cowles Blade, and a low shear (Hobart) mixer. The preparation of the wall compounds was carried out at ambient temperature.

The ENCOR 412 acrylic emulsion polymer and water were added to a suitable sized beaker and stirred with an overhead driven Cowles mixing blade set on a low speed setting. The barium hydroxide inhibitor was then added with stirring on a low speed setting for 10 minutes, then on a medium speed setting for 5 minutes and on a low speed setting again. After the barium hydroxide was dissolved, the DOWANOL PnB Glycol Ether, THIXOL 53 L, RHODO-LINE FT 100, RHODOLINE 622, calcium carbonate were added sequentially while stirring on a low speed setting. HEC was then added, and the mixer speed was increased to a high speed setting as the viscosity of the mixture increased upon addition of the HEC. The NaOH and color indicator were then added and after the addition was completed, high speed mixing of this pre-mix was continued for approximately 10 minutes.

The premix was then used without delay in the following step: K20 Glass Bubbles were added to the mixing bowl of the Hobart low shear mixer. The premix was then added to the mixer by aid of a rubber spatula and the mixer was covered with a plastic film or aluminum foil to contain the very low density glass bubbles that tend to be stirred out of the bowl without any physical means to contain them. After providing this containment, the mixer was started on low speed very briefly multiple times until virtually all the glass bubbles were wet with the premix mixture. At that point the plastic film or aluminum foil was removed from the bowl. The mixer speed was then increased to medium for approximately two minutes, then to high speed for approximately one minute. The mixer was then stopped and the batch was inspected. Water was added as needed to provide the desired consistency of the product. A skilled operator can determine the amount of water to add while mixing at high speed by auscultation. If the viscosity is in the correct range, the mixture will make a distinctive low pitched sound as air begins to be entrained in the mixture. The mixture was then transferred to a plastic bucket with a lid, for storage.

The compositions of the resultant wall compounds are summarized in Table 2. The material amounts provided are in weight percent (of the material as supplied by the vendor, or as indicated in the Table). It should be understood that the percentages reported for this and the other Examples herein reflect the accuracy and tolerances of the apparatus and measurements used. Batch sizes were approximately 2.0 kilograms. The total solids of all formulations is about 58%.

The pH of the wall compound Examples 1-4 in Table 2 containing the thymolphthalein blue color indicator (TTL) was about 13. The pH of the wall compound Examples 5-6 in Table 2 containing the dibromothymolphthalein blue color indicator (TTLD) was in the range of 12.5-12.8. The pH of the wall compound Example 7 in Table 2 containing the o-cresolphthalein purple color indicator was about 13.

No fading of the initial blue color of the wall compound was observed for all of the Examples 1-6 after being in an oven at 120° F. for at least one month. The color of the wall compounds for all of the Examples 1-6 changed from blue to white within 2-3 hours of being applied to drywall surface. No fading of the initial purple color of the wall compound was observed for Example 7 after being in an oven at 120° F. for at least one month. The color of the wall compound of Example 7 changed from purple to white within 2-3 hours of being applied to drywall surface.

Examples 8-23

A batch of wall compounds was prepared by the general method of Examples 1-6. The compositions of the resultant compounds are summarized in Tables 3-6. The material amounts provided are in weight percent (of the material as supplied by the vendor, or as indicated in the Table). It should be understood that the percentages reported for these and the other Examples herein reflect the accuracy and tolerances of the apparatus and measurements used. Batch sizes were approximately 2.0 kilograms.

TABLE 2

| | Wall Compound compositions-with barium hydroxide inhibitor | | | | | | |
| Material | Example 1 | Example 2 | Example 3 | Example 4 | Example 5 | Example 6 | Example 7 |
|---|---|---|---|---|---|---|---|
| ENCOR 412 | 25.00 | 25.00 | 25.00 | 25.00 | 25.00 | 25.00 | 25 |
| Water | 25.43 | 25.23 | 25.03 | 24.83 | 26.43 | 26.23 | 24.83 |
| Ba(OH)$_2$ | 0.82 | 0.82 | 0.82 | 0.82 | 0.82 | 0.82 | 0.82 |
| DOWANOL PnB Glycol Ether | 0.17 | 0.17 | 0.17 | 0.17 | 0.17 | 0.17 | 0.170 |
| THIXOL 53 L | 0.30 | 0.30 | 0.30 | 0.30 | 0.30 | 0.30 | 0.3 |
| RHODOLINE FT 100 | 1.00 | 1.00 | 1.00 | 1.00 | 1.00 | 1.00 | 1.000 |
| RHODOLINE 622 | 0.004 | 0.004 | 0.004 | 0.004 | 0.004 | 0.004 | 0.004 |
| HUBERCARB W4 | 26.43 | 26.43 | 26.43 | 26.43 | 26.43 | 26.43 | 26.43 |
| HEC | 0.15 | 0.15 | 0.15 | 0.15 | 0.15 | 0.15 | 0.15 |
| NaOH (20% by weight solids, in water) | 1.40 | 1.60 | 1.80 | 2.00 | 0.40 | 0.60 | 2.00 |
| Blue TTL (2% by weight solids, in 70:30 isopropyl alcohol:water) | 1.30 | 1.30 | 1.30 | 1.30 | — | — | — |
| Blue TTLD (2% by weight solids in ethyl alcohol) | — | — | — | — | 1.30 | 1.30 | — |
| o-cresolphthalein (2% by weight solids, in 70:30 isopropyl alcohol:water) | — | — | — | — | — | — | 1.30 |
| K20 Glass Bubbles | 18.00 | 18.00 | 18.00 | 18.00 | 18.00 | 18.00 | 18.00 |

TABLE 3

| Wall Compound compositions with calcium inhibitor | | | | |
|---|---|---|---|---|
| Material | Example 8 | Example 9 | Example 10 | Example 11 |
| ENCOR 412 | 28.000 | 28.000 | 28.000 | 28.000 |
| Water | 12.000 | 12.000 | 12.200 | 18.300 |
| DOWANOL PnB Glycol Ether | 0.200 | 0.200 | 0.170 | 0.170 |
| THIXOL 53 L | — | — | 0.30 | 0.30 |
| HEC | 0.15 | 0.20 | — | — |
| RHODOLINE FT 100 | 1.000 | 1.000 | 1.000 | 1.000 |
| $CaCl_2$ (10% by weight solids, in water) | 11.40 | 11.40 | 11.430 | 6.000 |
| $Ca(OH)_2$ | — | — | 0.50 | 0.50 |
| K20 Glass Bubbles | 10.00 | 10.00 | 15.000 | 15.000 |
| SPEX-LITE MB 1755 | — | — | — | — |
| HUBERCARB W4 | 31.30 | 31.20 | 26.200 | 27.026 |
| Blue TTL (2% by weight solids, in 70:30 isopropyl alcohol:water) | 1.00 | 1.00 | 1.200 | 1.200 |
| NaOH (20% by weight solids, in water) | 5.00 | 5.00 | 4.000 | 2.500 |

TABLE 4

| Wall Compound compositions with polymer microspheres | | | |
|---|---|---|---|
| Material | Example 12 | Example 13 | Example 14 |
| ENCOR 412 | 25 | 28 | 25 |
| Water | 18.876 | 17.5 | 24.12 |
| $Ba(OH)_2$ | 0.5 | — | 0.5 |
| DOWANOL PnB Glycol Ether | 0.170 | 0.170 | 0.170 |
| THIXOL 53 L | 0.3 | 0.3 | 0.3 |
| RHODOLINE FT 100 | 1.387 | 1.000 | 1.387 |
| RHODOLINE 622 | 0.004 | 0.004 | 0.004 |
| SPEX-LITE MB 1755 | — | 1.5 | 1.5 |

TABLE 4-continued

| Wall Compound compositions with polymer microspheres | | | |
|---|---|---|---|
| Material | Example 12 | Example 13 | Example 14 |
| HUBERCARB W4 | 50.263 | 46.226 | 43.519 |
| HEC | 0.2 | — | 0.2 |
| NaOH (20% by weight solids, in water) | 2 | 4.000 | 2 |
| Blue TTL (2%% by weight solids, in 70:30 isopropyl alcohol:water) | 1.300 | 1.300 | 1.300 |

TABLE 5

| Wall Compound compositions with commercial and prepared indicators | | | |
|---|---|---|---|
| Material | Example 15 | Example 16 | Example 17 |
| Encor 412 | 25 | 25 | 25 |
| Water | 26.43 | 26.43 | 26.43 |
| $Ba(OH)_2$ | 0.82 | 0.82 | 0.82 |
| DOWANOL PnB Glycol Ether | 0.17 | 0.17 | 0.17 |
| THIXOL 53 L | 0.3 | 0.3 | 0.3 |
| RhodOLINE FT 100 | 1 | 1 | 1 |
| RhodOLINE 622 | 0.004 | 0.004 | 0.004 |
| HUBERCARB W4 | 26.43 | 26.43 | 26.43 |
| HEC | 0.15 | 0.15 | 0.15 |
| NaOH (20% by weight solids, in water) | 0.4 | 0.4 | 0.4 |
| Blue TTLD (2% by weight solids in ethyl alcohol) | 1.3 | — | — |
| Blue TTLTC (2% by weight solids in ethyl alcohol) | — | 1.3 | — |
| Blue TTLDBTC (2% by weight solids in ethyl alcohol) | — | — | 1.3 |
| K20 Glass Bubbles | 18 | 18 | 18 |

TABLE 6

| Wall Compound compositions with Attagel-19 | | | | | | |
|---|---|---|---|---|---|---|
| Material | Example 18 | Example 19 | Example 20 | Example 21 | Example 22 | Example 23 |
| Encor 412 | 28 | 28 | 28 | 28 | 28 | 28 |
| Water | 25.6 | 25.6 | 25.6 | 25.6 | 25.6 | 25.6 |
| $Ba(OH)_2$ | 0.82 | 0.82 | 0.82 | 1.09 | 1.18 | 1.27 |

TABLE 6-continued

| Material | Wall Compound compositions with Attagel-19 | | | | | |
|---|---|---|---|---|---|---|
| | Example 18 | Example 19 | Example 20 | Example 21 | Example 22 | Example 23 |
| DOWANOL PnB Glycol Ether | 0.17 | 0.17 | 0.17 | 0.17 | 0.17 | 0.17 |
| Attagel-19 | 0 | 0.5 | 1 | 1 | 1 | 1 |
| RHODOLINE FT 100 | 1 | 1 | 1 | 1 | 1 | 1 |
| RHODOLINE 622 | 0.004 | 0.004 | 0.004 | 0.004 | 0.004 | 0.004 |
| HUBERCARB W4 | 24.6 | 24.1 | 23.6 | 23.33 | 23.24 | 23.15 |
| HEC | 0.15 | 0.15 | 0.15 | 0.15 | 0.15 | 0.15 |
| NaOH (20% by weight solids, in water) | 0.4 | 0.4 | 0.4 | 0.4 | 0.4 | 0.4 |
| Blue TTL (2% by weight solids, in 70:30 isopropyl alcohol:water) | 1.3 | 1.3 | 1.3 | 1.3 | 1.3 | 1.3 |
| K20 Glass Bubbles | 18 | 18 | 18 | 18 | 18 | 18 |
| Color Change Time from Blue to White | 2 hours | 1.5 hours | 1 hour | 1.5 hours | 2 hours | 2.5 hours |

The pH of the wall compound Examples 8-14 in Tables 3 and 4 was about 13. No fading of the initial blue color was observed for all of the wall compound Examples 8-14 after being in an oven at 120° F. for at least one month. The color of all the wall compound Examples 8-14 changed from blue to white within 2-3 hours of being applied to drywall surface.

The wall compounds of Examples 15-17 in Table 5 are made with the formulation showed as Example-5. The pH of the wall compound in Examples 15-17 in Table 5 containing the dibromothymolphthalein blue color indicator (TTLD), thymoltetrachlorophthalein (Blue TTLTC), or dibromothymoltetrachlorophthalein (Blue TTLDBTC) is in the range of 12.5-12.8.

No fading of the initial blue color of the wall compound was observed for all these three Examples after being in an oven at 120° F. for at least one month. The color of the wall compounds for the Examples with TTLD and Blue TTLTC blue indicator changed from blue to white within 2-3 hours of being applied to drywall surface. The color of Examples with Blue TTLDBTC blue indicator doesn't change from blue to white.

The wall compounds of Examples 18-23 in Table 5 are made with the formulations shown. Examples 18-20 of compound with Attagel-19 demonstrate the color changing time from blue to white decreasing by increasing the amount of Attagel-19. Examples 21-23 of wall compounds with constant Attagel-19 level demonstrate the color change time from blue to white increasing by increasing Ba(OH)$_2$.

The recitation of all numerical ranges by endpoint is meant to include all numbers subsumed within the range (i.e., the range 1 to 10 includes, for example, 1, 1.5, 3.33, and 10).

The patents, patent documents, and patent applications cited herein are incorporated by reference in their entirety as if each were individually incorporated by reference. It will be apparent to those of ordinary skill in the art that various changes and modifications may be made without deviating from the inventing concepts set from above. Thus, the scope of the present disclosure should not be limited to the structures described herein. Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims and equivalents thereof.

What is claimed is:

1. A wall compound comprising:
a latex resin or resin binder;
a filler material comprising soda-lime-borosilicate glass bubbles;
a drying indicator, wherein the drying indicator includes a phthalein-containing pH color change indicator; and
an inhibitor comprising at least one of a barium cation and calcium cation;
and wherein the compound is alkaline, shelf stable, and demonstrates a human-observable change in color upon drying.

2. The wall compound of claim 1, wherein the drying indicator is a thymolphthalein-based pH color change indicator.

3. The wall compound of claim 2, wherein the drying indicator is selected from the group consisting of thymolphthalein, dibromothymolphthalein, thymoltetrachlorophthalein, and dibromothymoltetrachlorophthalein, and combinations thereof.

4. The wall compound of claim 1, where the filler further comprises calcium carbonate.

5. The wall compound of claim 1, wherein the composition includes a thickener package.

6. The wall compound of claim 5, wherein the thickener package includes at least one of a cellulosic thickener and a HASE thickener.

7. The wall compound of claim 6, wherein the thickener package includes a cellulosic thickener comprising HEC.

8. The wall compound of claim 1, wherein the latex resin or resin binder is 100% acrylate.

9. The wall compound of claim 1, wherein the wall compound further comprises at least one of a pH control agent and a smoothing agent.

10. The wall compound of claim 9, wherein the smoothing agent is an organic ether smoothing agent.

11. The wall compound of claim 9, wherein the pH control agent comprises at least one of NaOH, KOH, K$_2$CO$_3$.

12. The wall compound of claim 1, wherein the inhibitor includes barium hydroxide, calcium chloride, or combinations thereof.

13. The wall compound of claim 1, further comprising titanium dioxide.

14. A kit, comprising:

the wall compound of claim 1; and a tool for applying, smoothing, or removing the repair compound.

15. The kit of claim 14, further including instructions for using at least one of the repair compound and the tool.

16. A wall compound comprising:

an acrylic binder;

a filler material comprising soda-lime-borosilicate glass bubbles;

a drying indicator, wherein the drying indicator includes a phthalein-containing pH color change indicator; and an inhibitor comprising a barium cation;

and wherein the compound is alkaline and demonstrates a human-observable change in color upon drying.

17. The wall compound of claim 16, wherein the drying indicator is a thymolphthalein-based pH color change indicator.

18. The wall compound of claim 17, wherein the drying indicator is selected from the group consisting of thymolphthalein, dibromothymolphthalein, thymoltetrachlorophthalein, and dibromothymoltetrachlorophthalein, and combinations thereof.

19. The wall compound of claim 16, where the filler further comprises calcium carbonate.

\*    \*    \*    \*    \*